United States Patent
McGeachy

[15] 3,680,577
[45] Aug. 1, 1972

[54] CLOSED CENTER VALVE

[72] Inventor: Donald E. McGeachy, Highland, Mich.

[73] Assignee: Numatics, Incorporated, Highland, Mich.

[22] Filed: Nov. 30, 1970

[21] Appl. No.: 93,772

[52] U.S. Cl. ............................................. 137/625.6
[51] Int. Cl. .............................................. F16k 11/07
[58] Field of Search .91/426; 137/464, 625.6, 625.66

[56] References Cited

UNITED STATES PATENTS

| | | | |
|---|---|---|---|
| 2,851,056 | 9/1958 | MacGlashan et al. | 137/464 |
| 3,540,480 | 10/1970 | Leibfritz | 137/625.6 |
| 3,566,747 | 3/1971 | Frame | 91/426 X |

Primary Examiner—Henry T. Klinksiek
Attorney—Barnes, Kisselle, Raisch & Choate

[57] ABSTRACT

A control valve for fluid operated circuits for controlling machines and the like which includes a valve member biased to a pressure-off position with a pilot passage and control chamber to effect a line-pressure on-position with a change-over from pilot control to a holding position from line pressure. If line pressure is interrupted for any reason, the valve member returns to a pressure-off position and must be reactivated by an operator, thus preventing an accidental machine start-up when line pressure is restored. The closed center condition as the valve moves to a work position permits change-over from pilot to main pressure control with no pressure loss.

12 Claims, 9 Drawing Figures

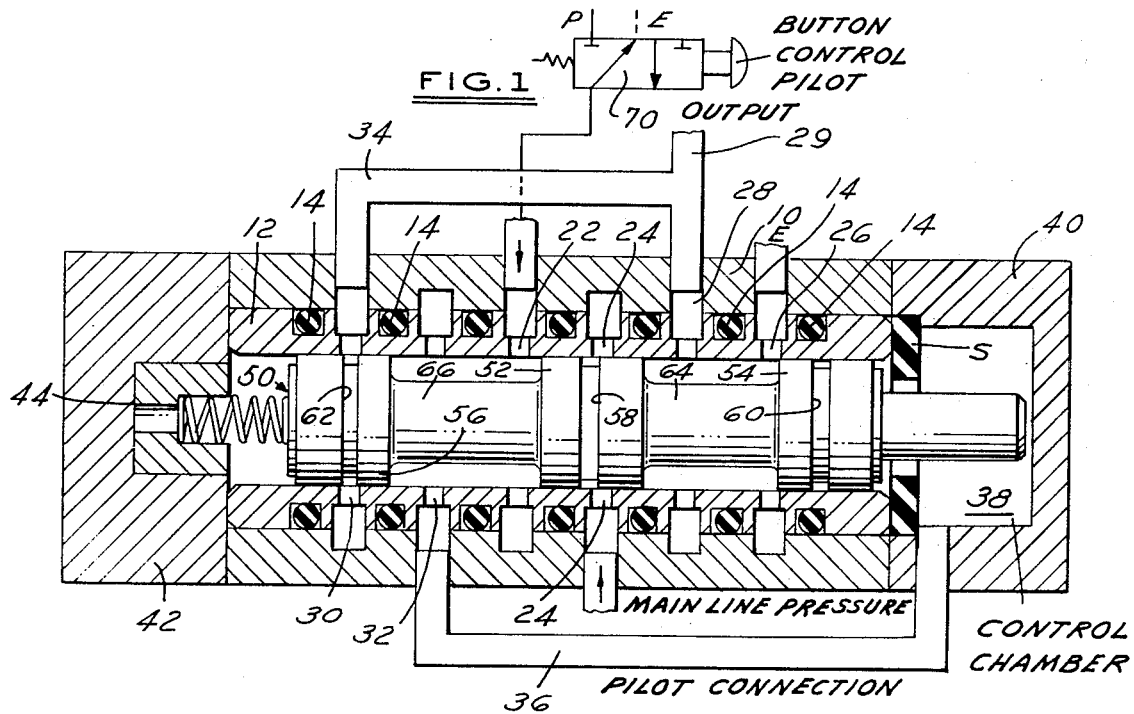
FIG. 1
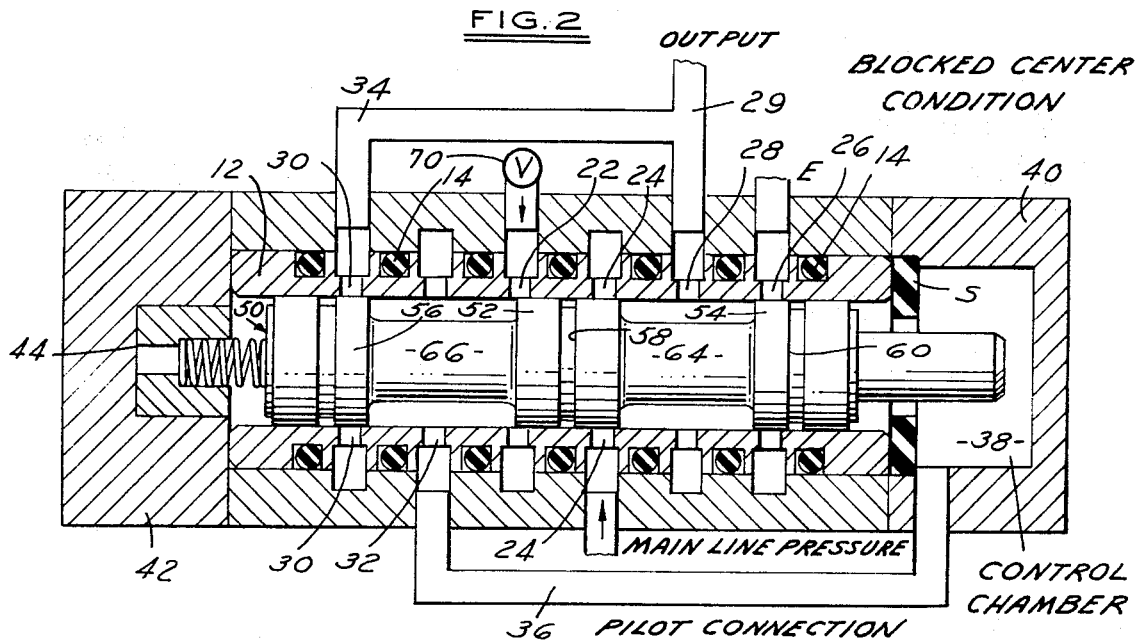
FIG. 2 — BLOCKED CENTER CONDITION
INVENTOR
DONALD E. McGEACHY
BY
Barnes, Kisselle, Raisch & Choate
ATTORNEYS

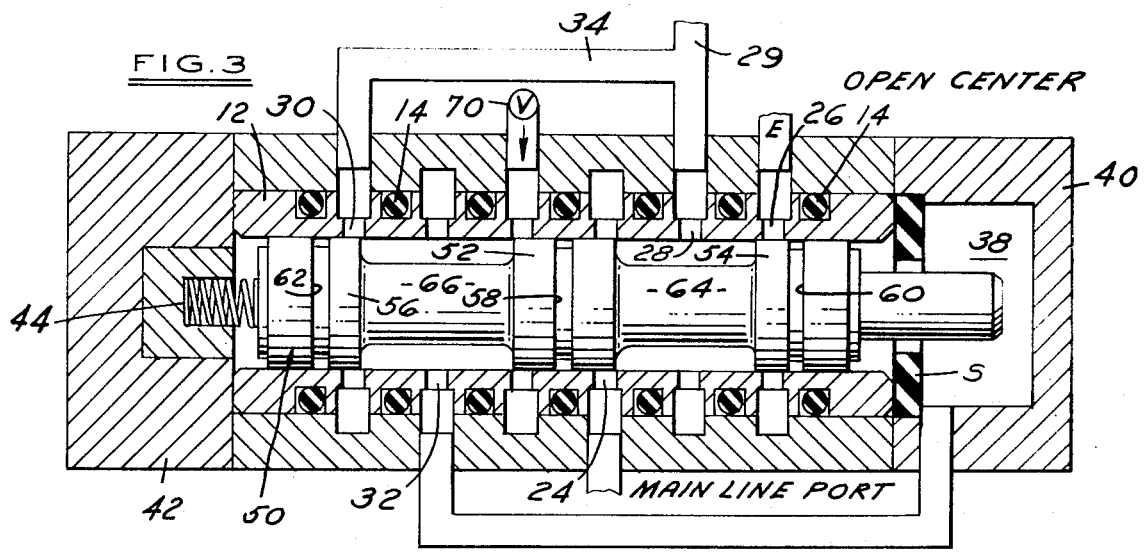
FIG.3 — OPEN CENTER
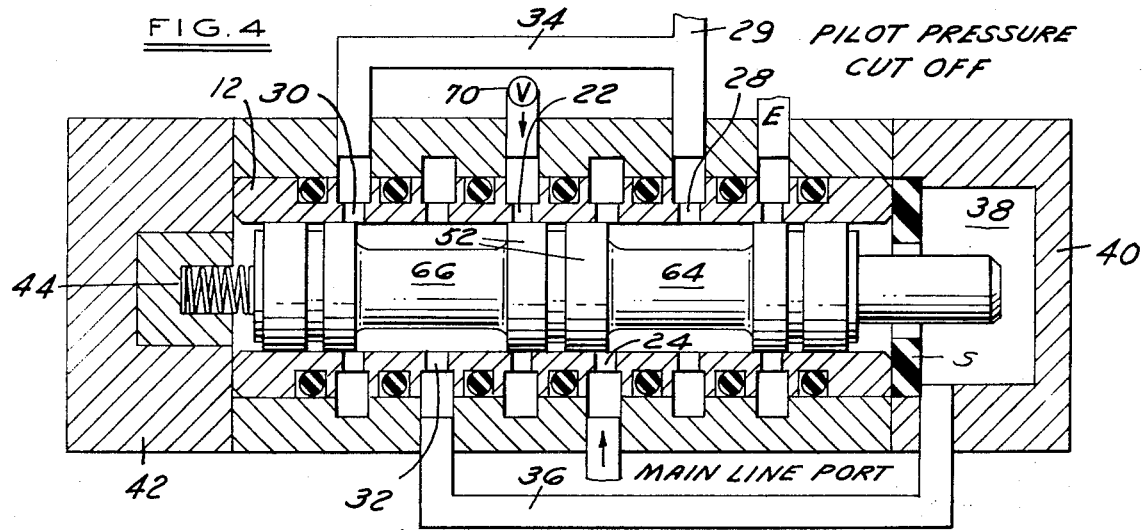
FIG.4 — PILOT PRESSURE CUT OFF
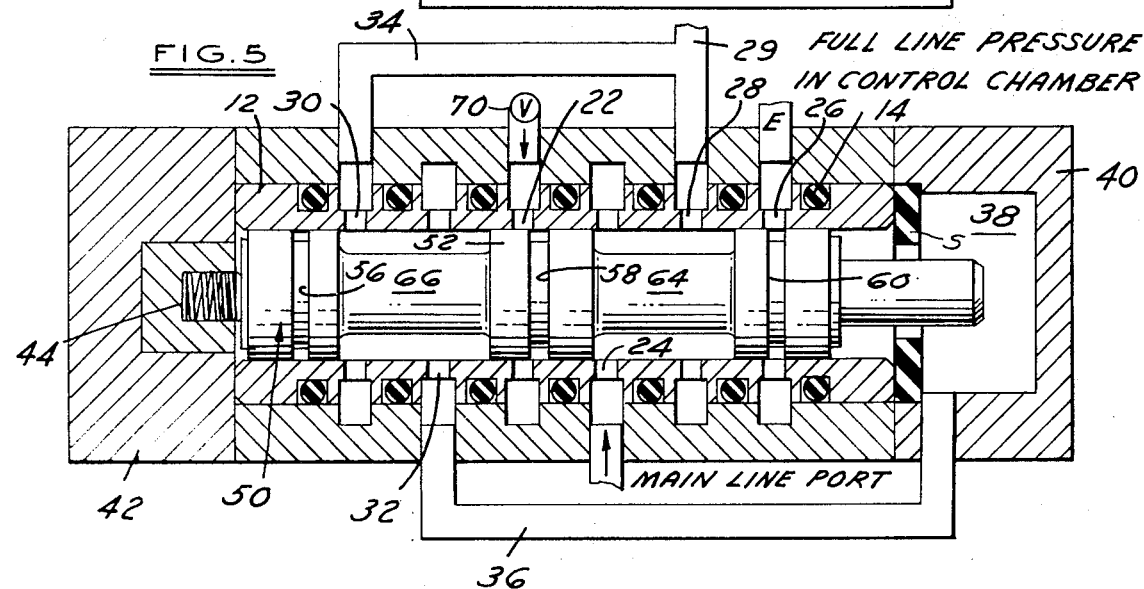
FIG.5 — FULL LINE PRESSURE IN CONTROL CHAMBER

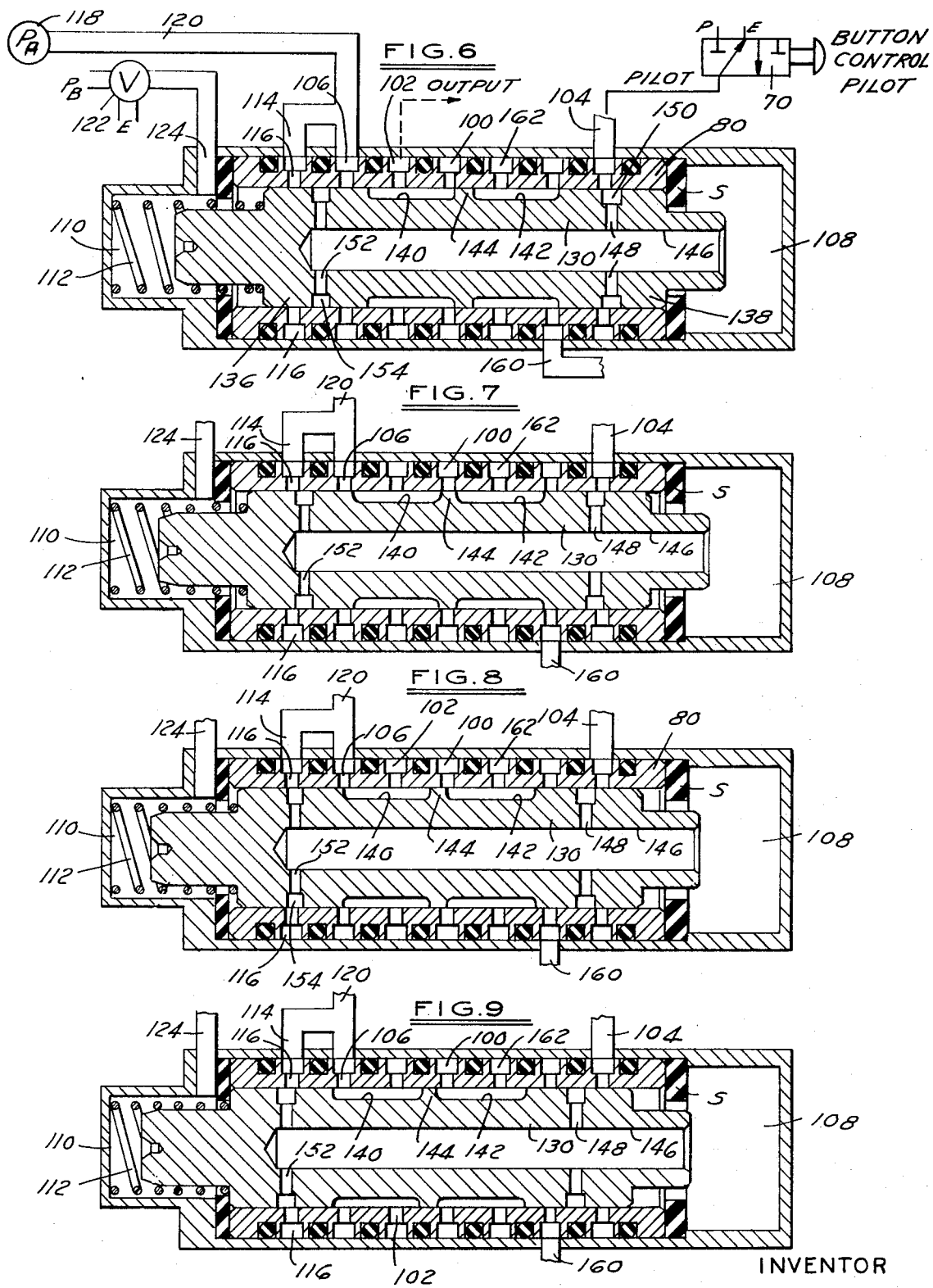

CLOSED CENTER VALVE

This invention relates to a Closed Center Valve With an Off-Return Memory to serve as a control valve for pneumatically operated equipment and more particularly is related to a control valve which has safety features which prevent inadvertent actuation of certain machines in the event of an air pressure failure or interruption.

It is an object of the invention to provide a control valve for pneumatic equipment which, in the event of supply pressure interruption, will always return to a position which requires manual re-actuation. Thus, if a machine is operating during a failure of pneumatic pressure, the valve will return to a pressure-off position and require intentional reactuation before the controlled machine will restart.

It is a further object of the invention to provide a control valve which has an automatic change-over holddown which switches from pilot pressure to line pressure during the movement of the valve toward the actuation position.

It is a further object to provide a valve having ports which are so related to each other that there can be a smooth change-over from pilot operation to pressure hold.

Other objects and features of the invention relating to the details of construction and operation will be apparent in the following description and claims.

Drawings accompany the disclosure and the various views thereof may be briefly described as follows:

FIG. 1, a sectional view showing the valve construction.

FIGS. 2 to 5, views similar to FIG. 1 showing the control spool of the valve in various operating conditions.

FIGS. 6 to 9, views of a modified valve with internal cross-over passages shown in various operating positions.

REFERRING TO THE DRAWINGS

The control valve has a main housing 10 with a cylindrical bore containing a valve sleeve 12 having a plurality of outer grooves containing O-rings 14. The valve sleeve has six outer grooves which connect with pressure and exhaust ports leading to the interior of the sleeve 12, the O-rings 14 being disposed on either side of each annular port.

On either side of the longitudinal center of the valve are pressure ports, namely, a pilot pressure port 22 left of center and a main line pressure port 24 to the right of center. Near the right end of the valve is an exhaust port 26 and between the main line pressure port 24 and the exhaust port 26 is an output or a work port 28 leading to an output work line 29. Near the left-hand end of the valve sleeve is a port 30 and between this port 30 and the pilot port 22 is a pilot connection port 32.

It will be seen that there is a longitudinal branch passage 34 which connects port 30 and port 28 and there is a longitudinal passage 36 which connects port 32 with a control chamber 38 in an end cap 40 secured at the right-hand end of the valve assembly. At the left-hand end of the valve housing is a second end cap 42 which serves as a seat for a return spring 44 which bears against the end of a valve spool 50 which has three lands, namely, a central land 52, a right-hand land 54, and a left-hand land 56. Each land is grooved at 58, 60 and 62 respectively in a conventional manner.

Between the central land 52 and the right-hand land is an ensmalled or narrowed neck 64 and similarly, between the center land 52 and the left-hand land 62, is an ensmalled or narrowed neck 66. Spacing of the lands and the ports in the valve spool is critical. The drawings illustrate various stages in the operation of the control valve, the structure being the same in each drawing and the position of the valve spool being altered from FIG. 1.

In the condition of the valve in FIG. 1, the spool spring 44 has biased the spool to the right. Under these conditions, the output or work port 28 is connected to the exhaust port 26 past the neck portion 64. The main line pressure port 24 is blocked. The control chamber 38 is connected through pilot connection line 36 past the neck portion 66 to the pilot pressure port 22 which is exhausted through pilot valve 70.

When a normally off-pilot valve 70 is actuated against a spring bias to admit pilot pressure into the port 22, it will pass neck portion 66 to port 32 and the control chamber 38 to begin moving the valve against the spring 44 to the left. The condition is shown in FIG. 2 wherein the control chamber is pressurized and the portion around the neck 66 is pressurized but there is what might be referred to as a blocked center condition at this point because the valve has shifted to the point that the exhaust port 26 is shut off before the main line pressure port 24 is opened, allowing no escape of main line pressure to atmosphere. At this stage pilot pressure from port 22 is still blocked from port 30. As the valve moves a little further to the left, as shown in FIG. 3, the main line port 24 cracks slightly to allow main line pressure to move in around the neck 64 and toward the work output port 28. At the same time, the main line pressure from branch line 34 is now beginning to crack into the port 30 leading to port 32 and the control chamber 38. This may be termed the condition during which both pilot and main pressure are going to the control chamber at the right-hand end of the valve.

In FIG. 4, the valve has moved to the point where the pilot pressure from the port 22 is cut off by land 52 from the pilot connection 36 and from the branch line 34. Thus, the pilot signal is completely removed from the system and exhausted by releasing pilot valve 70.

The pressure, which is now passing from the main line port 24, is now moving past land 52 and neck 64 to the work outlet port 28 and through the branch line 34 to port 30 and past neck 66 to port 32 where it passes into the pilot connection line 36 and to the control chamber 38. Thus, the main line pressure is now holding the valve over to the left against the spring 44.

In FIG. 5, the full stroke to the left is illustrated and the same pressure conditions exist in this position as were initiating in the position in FIG. 4. The valve will remain in this position as long as the main line supply is maintained at port 24. If this pressure should at some time fail, the valve 50 will move under the action of spring 44 to the original position shown in FIG. 1, cutting off main line pressure from the control chamber 38 and opening line 29 to exhaust 26. This makes it necessary to introduce pilot pressure again by a conscious manual operation of spring shut-off pilot valve 70 before the flow from the main line pressure port 24 can be established to the work outlet conduit 29. Thus, there is a safety feature in this valve which makes it impossible for a machine to operate when line pressure is restored after repair of a pressure failure or a line failure of an emergency shut-down. In addition, the valve is so constructed that there is a smooth change-over from pilot pressure control to main line pressure control even though there might be different pressures involved in the two systems.

In FIGS. 6 to 9, a modified valve construction is shown, the various figures showing the movable portion of the valve in different operating positions. In this embodiment, the central part of the valve spool has been provided with a passage as will be described to eliminate the necessity for an outside cross-passage. This spool configuration also provides an additional working flow path as will be explained below.

As shown in FIG. 6, the valve sleeve 80 is shown having various annular ports and intermittent grooves for O-rings which will seal off the various ports in a suitable housing such as shown at 10 in FIG. 1. To simplify the drawings, the housing has not been delineated except by boundary lines. The sleeve 80 has an exhaust port 100, an output port 102, a pilot port 104, and a main pressure port 106. A pilot pressure chamber 108 will be provided by the housing at the right-hand end of the valve and a combination pilot and spring pressure chamber 110 is provided at the left-hand end of the valve containing a spring 112. The pressure port 106 has a branch passage 114 leading to a port 116. A source of pressure $P_A$ at 118 is connected to port 106 by a line 120 and an independent source $P_B$ is connected through a valve 122 with a pressure inlet 124 leading to spring chamber 112.

A valve spool 130 in FIGS. 6 to 9 has a main land 136 at the left-hand end, and a main land 138 at the right-hand end. The central portion of the valve is reduced in cross-section to provide two ensmalled areas 140 and 142 separated by a short land 144. The valve spool 130 has a bore 146 from the right-hand end which is connected by cross-passages 148 to an annular port 150 in land 138 and by cross-passages 152 to an annular port 154 in the land 136. Cushion stops S at each end of the housing serve to limit the motion of the valve spool 130.

Referring to the drawings, when the valve is in the position shown in FIG. 6, it is biased by spring 112 to the right. The pressure supply $P_A$ is on ports 106 and 116. There is a possibility of an optional pressure supply on a port 160 depending on whether the valve is to be used for a system output at 102. The port 160 may also be used as a back check to determined spool position. This optional pressure at port 160 passes to an outlet port 162. The outlet port 102 from the cylinder is exhausted through port 100.

To initiate operation in controlling a pressure system, a pilot signal can be applied at control port 104 and this signal passes through ports 150 and 148 and passage 146 in the spool to chamber 108 to initiate movement of the spool to the left against the spring 86. This initial movement as shown in FIG. 7 blocks ports 106 and 160 and also the exhaust port 100, but the branch-passage 114 is beginning to crack into the ports 154 and 152 to the center bore 146 of the valve, thus allowing a pressure to continue from both the pilot source and port 116 to chamber 108 to further shift the valve to the left. The progress of the valve to the left is shown further in FIG. 8 where it will be seen that the pilot pressure port is blocked from the annular port 150 so that the pilot signal which is coming from a button valve as, for example, valve 70 in FIG. 1, can be removed. The pressure from ports 106 and 114 continues to move the spool to the left and port 106 opens to port 102. In addition, optional port 162 is connected to exhaust port 100; port 160 remains blocked.

In FIG. 9, the valve is shown moved to its full position to the left against the spring 112 and the stop at that end of the valve. The valve will remain in this position as long as pressure at 106 is maintained or until a signal is applied to control port 124 which can be accomplished through the operation of the valve 122. Pilot pressure $P_B$ in spring chamber 110 balances holding pressure in pilot chamber 108 and spring 112 immediately returns the spool to the right as in FIG. 6. This is generally used only in emergencies. The valve could also be turned off or returned to the original position by the loss of pressure at port 106.

A detented valve in pneumatic systems has a retentive memory, but it does not have what is called an off-return characteristic if pressure is interrupted in the system. The same valve action can be accomplished with what is sometimes called an open center valve but this results in considerable loss of pressure during the cross-over condition. A standard closed center valve may lock up in the cross-over condition and all the ports thereof will be blocked so that it cannot move over to a main pressure hold position. The valves of the present invention can be initiated by pilot pressure and held by the main pressure in the system so that any loss or interruption of the main line pressure will cause the valve to return to the point that it needs to be manually operated again before it will perform its function. The valve described in connection with FIGS. 1 to 5 illustrates a three-way valve construction wherein longitudinal passages are provided in the main valve housing or outside the main housing and the valve in FIGS. 6 to 9 shows a similar type of construction but utilizing the longitudinal passages through the center of the moving valve spool. The valve in FIGS. 6 to 9 illustrates a valve which is normally a three-way valve. It does, however, as above pointed out, provide a second flow path, ports 160, 162, with the addition of a second pressure source at 160 (optional).

I claim:

1. An off-return valve for use in machine control circuits having a line pressure source and a pilot pressure source which comprises:
   a. a valve housing having a valve bore provided with spaced inlets and outlets along said bore,
   b. a valve spool slidable in said bore forming with said bore at one end a control chamber wherein said spool is shifted away from said end in response to pressure in said chamber,
   c. said spool having lands and passages cooperating in one position with said inlets and outlets along said bore to direct pilot pressure to said chamber and in a second position to direct line pressure to said chamber and in a third position to cut off pilot pressure from said chamber, and
   d. means between said spool and said housing to bias said spool toward said chamber wherein a failure of line pressure will cause said spool to return to said one position.

2. An off-return valve for use in machine control circuits having a line pressure source and a pilot pressure source which comprises:
   a. a valve housing having a bore provided with spaced inlets and outlets along said bore,
   b. a valve spool slidable in said bore forming with said bore at one end a control chamber wherein said spool is shifted away from said end in response to pressure in said chamber, said spool having spaced lands and grooves to control line pressure to an outlet and to lead pilot pressure and line pressure sequentially to said chamber as said valve is moved initially by pilot pressure and to cut off pilot pressure as said valve is moved by line pressure, and
   c. means in said housing to bias said spool toward said chamber.

3. An off-return valve for use in machine control circuits having a line pressure source and a pilot pressure source which comprises:
   a. a valve housing having a bore provided with spaced inlets and outlets along said bore,
   b. a valve spool slidable in said bore forming with said bore at one end a control chamber wherein said spool is shiftable away from said control chamber end in response to pressure in said chamber, said spool having a central land and two end lands separated by narrowed neck portions, said central land serving sequentially to block a line pressure inlet and a pilot pressure inlet in said housing and said narrowed portions serving to connect, sequentially, pilot pressure to said chamber and line pressure to said chamber and to cut off pilot pressure to said chamber as the spool moves away from said chamber, and
   c. means in said housing to bias said spool toward said chamber.

4. An off-return valve for use in machine control circuits having a line pressure source and a pilot pressure source which comprises:
   a. an elongate valve housing having a valve spool bore therein provided with line and pilot pressure ports in the central region, a work outlet at one end, and spaced control ports at the other end, one control port leading to a control chamber at one end of said housing, and another control port leading to a branch line connected to said work outlet,
   b. a valve spool slidable in said bore forming with said bore at one end the said control chamber wherein said spool is shiftable away from said control chamber end in response to pressure in said chamber, said spool having a central land and two end lands separated by narrowed neck portions, said central lands serving sequentially to block and open the said line pressure ports as it moves away from said control chamber, and to block said pilot pressure port as it moves from said control chamber, said narrowed portions serving sequentially to pass pilot pressure to a control port leading to said control chamber and to connect said control ports, and to connect line pressure to said work outlet, and
   c. means in said housing to bias said spool toward said control chamber, wherein in a first position of said spool pilot pressure is directed to said control chamber, line pressure is cut off, and as said spool moves against said bias means by pilot pressure in said control chamber, line pressure is opened to said work outlet and line pressure is admitted from said branch line to said control ports and to said control chamber while pilot pressure is cut off therefrom.

5. An off-return valve for use in machine control circuits having a line pressure source and a pilot pressure source which comprises:
   a. an elongate valve housing having a valve spool bore therein provided with a plurality of axially spaced ports, including spaced line and pilot pressure ports in a central region, a work outlet port on one side of said pressure ports and a pair of spaced control ports on the other side of said pressure ports,
   b. means forming a control chamber at one end of said housing,
   c. means forming a passageway connecting said control chamber and the first of said control ports,
   d. means forming a passageway connecting said work outlet port and the second of said control ports,
   e. a valve spool shiftable in said bore biased toward said control chamber having three spaced lands with connecting neck portions, said lands being dimensioned and spaced axially relative to the spacing of said ports to effect the connection of said pilot pressure port with said first control port in one position and connection of said line pressure port to said work outlet port simultaneously with the connection of said second control port with said first control port upon actuation of said valve by pilot pressure in said control chamber, and to effect closing of said pilot pressure port from said first control port upon further actuation by said pressure from said line pressure port.

6. A valve as defined in claim 5 in which pilot pressure is delivered from said pilot pressure port to said first control port and said work outlet port is connected to an exhaust port through said neck portions in said one position of said valve spool.

7. An off-return valve for use in machine control circuits having a line pressure source and a pilot pressure source which comprises:
   a. a valve housing having a valve bore provided with spaced inlets and outlets along said bore, including a pilot port, a cylinder port, an exhaust port, a pressure port, and a pressure control port,
   b. a valve spool slidable in said bore forming with said bore at one end a control chamber wherein said spool is shifted away from said chamber in response to pressure in said chamber, and having first and second control lands at each end and a central land between said control lands, and having a longitudinal bore connected to annular grooves on each of said control lands, said groove on said first control land serving to connect said pilot port to said chamber in a first position of said valve, said groove on said second land serving to connect said pressure port to said chamber in a second position of said valve, c. said spool having ports and passages cooperating in one position with said inlets and outlets along said bore to direct pilot pressure to said chamber and in a second position to cut off said pilot pressure and direct line pressure to said chamber, and d. means in said housing to bias said spool toward said control chamber.

8. An off-return valve for use in machine control circuits having a line pressure source and a pilot pressure source which comprises:

a. a valve housing having a valve bore provided with spaced inlets and outlets along said bore, including a pilot port, a cylinder port, an exhaust port, a pressure port, and a pressure control port, b. a valve spool slidable in said bore forming with said bore at one end a control chamber wherein said spool is shifted away from said chamber in response to pressure in said chamber, and having first and second control lands at each end and a central land between said control lands, and having a longitudinal bore connected to annular grooves on each of said control lands, said groove on said first control land serving to connect said pilot port to said chamber in a first position of said valve, said groove on said second land serving to connect said pressure port to said chamber in a second position of said valve, c. said central land serving to close said exhaust port as said valve moves between said first and second positions, d. said spool having ports and passages cooperating in one position with said inlets and outlets along said bore to direct pilot pressure to said chamber and in a second position to cut off said pilot pressure and direct line pressure to said chamber, and e. means in said housing to bias said spool toward said control chamber.

9. A valve for selectively reversing the connections of one or more working lines with a pressure supply passage and with an exhaust passage comprising a body, a shiftable spool in the body, a spring in said body for biasing the spool to a first position, a pressure chamber in said body adjacent said spool for shifting the spool to a second position against the bias, cooperating ports in the body an the spool for connecting a working line to exhaust in the first position and to pressure supply in the second position, a pilot pressure supply port in the body, a pressure branch port in the body, and means on the spool for connecting the pressure chamber to the pilot pressure supply port in the first position and to the pressure branch port in the second position, whereby admission of pilot pressure to the pilot pressure port will cause the spool to shift from the first to the second position, and in so shifting will initiate a holding pressure supply to the pressure chamber from the pressure branch port and cut off said pilot port from said pressure chamber.

10. A valve as defined in claim 9 wherein the body includes an opposed pressure chamber adjacent said spool and spaced from said pressure chamber for shifting the spool from the second to the first position.

11. A valve as defined in claim 9 wherein the ports controlling the working line or lines are arranged to prevent communication between the pressure supply and the exhaust during the spool shift.

12. A valve as defined in claim 9 wherein the ports controlling the pressure chamber are arranged to permit communicating between the pilot pressure supply and the pressure branch port during the spool shift.

* * * * *